(12) United States Patent
Joshi et al.

(10) Patent No.: US 12,406,028 B1
(45) Date of Patent: Sep. 2, 2025

(54) SYSTEM AND METHOD FOR ANALYZING AND TUNING INPUT DATASET TO A FOUNDATION MODEL

(71) Applicant: ACCENTURE GLOBAL SOLUTIONS LIMITED, Dublin (IE)

(72) Inventors: Sarang Padmakar Joshi, Pune (IN); Pradnya Desai, Mumbai (IN); Hemant Chandrakant Patil, Pune (IN); Ninad Shashikant Kulkarni, Pune (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 18/812,559

(22) Filed: Aug. 22, 2024

(51) Int. Cl.
  *G06F 16/00* (2019.01)
  *G06F 18/2411* (2023.01)
  *G06N 20/00* (2019.01)

(52) U.S. Cl.
  CPC ......... *G06F 18/2411* (2023.01); *G06N 20/00* (2019.01)

(58) Field of Classification Search
  CPC .............................. G06F 16/285; G06F 16/35
  See application file for complete search history.

(56) References Cited

U.S. PATENT DOCUMENTS

| | | | |
|---|---|---|---|
| 9,367,526 B1 * | 6/2016 | Vozila | G06F 40/30 |
| 9,779,080 B2 * | 10/2017 | Caskey | G06F 40/274 |
| 10,861,439 B2 | 12/2020 | Doyle et al. | |
| 11,017,321 B1 * | 5/2021 | Mishra | G05B 23/0283 |
| 11,580,309 B1 * | 2/2023 | Mason | G06F 40/40 |
| 12,314,294 B1 * | 5/2025 | Browder | G06T 11/206 |

(Continued)

OTHER PUBLICATIONS

Bofang Li et al., "Neural Bag-of-Ngrams", Proceedings of Thirty-First AAAI Conference on Artificial Intelligence, Feb. 12, 2017, pp. 3067-3074.

(Continued)

*Primary Examiner* — Noosha Arjomandi
(74) *Attorney, Agent, or Firm* — Mannava & Kang, P.C.

(57) ABSTRACT

System and method for analyzing and tuning an input dataset to a foundation model is disclosed. The method includes, receiving an input dataset from a user, determining a textual representation of the received input dataset on an n-gram data level by processing the received input dataset, and determining a model score for the n-gram level by applying the determined textual representation to a trained artificial intelligence-based regression model. The method further includes, determining a best fit model and a unigram preparation data value for the n-gram level based on the determined model score, an n-gram preparation data value, and a type of n-gram using a trained classification model, wherein the best fit model is one of pretrained existing models and a dynamically trained n-gram model, predicting a bias score and an accuracy score for the input dataset by applying the determined textual representation and the input dataset onto the determined best fit model using a trained clustering model, generating a Prompt Inclusivity Index (PII) value based on the determined best fit model, the predicted bias score and the accuracy score, wherein the PII value indicates presence of bias data in the received input dataset, and outputting the generated PII value to a user via a user interface of a user device.

20 Claims, 7 Drawing Sheets

(56) References Cited

U.S. PATENT DOCUMENTS

| | | | | |
|---|---|---|---|---|
| 12,314,318 | B2* | 5/2025 | Bathwal | G06F 16/24575 |
| 2019/0258904 | A1* | 8/2019 | Ma | G06F 18/24133 |
| 2019/0370684 | A1* | 12/2019 | Gunes | G06N 20/00 |
| 2021/0240776 | A1* | 8/2021 | Jawagal | G06N 3/049 |
| 2023/0162481 | A1* | 5/2023 | Yuan | G06T 9/00 |
| | | | | 382/159 |
| 2024/0220876 | A1* | 7/2024 | Sharma | G06Q 10/0631 |
| 2024/0281446 | A1* | 8/2024 | Bathwal | G06F 16/9538 |
| 2024/0281697 | A1* | 8/2024 | Patel | G06N 20/00 |
| 2024/0320510 | A1* | 9/2024 | Kundu | G06N 3/096 |
| 2024/0370479 | A1* | 11/2024 | Hudetz | G06F 16/316 |
| 2024/0403566 | A1* | 12/2024 | Sengupta | G06F 40/35 |
| 2025/0028992 | A1* | 1/2025 | Foley | G06N 20/00 |
| 2025/0047622 | A1* | 2/2025 | Bodigutla | H04L 51/02 |
| 2025/0086427 | A1* | 3/2025 | Magnetta | G06N 3/045 |
| 2025/0111271 | A1* | 4/2025 | Lee | G06N 20/00 |
| 2025/0124001 | A1* | 4/2025 | Everest | G06F 16/16 |
| 2025/0124303 | A1* | 4/2025 | Levy | G06N 5/022 |
| 2025/0139449 | A1* | 5/2025 | Verbeke | G06N 3/09 |
| 2025/0174223 | A1* | 5/2025 | Mengibar | G10L 15/07 |

OTHER PUBLICATIONS

Kostiantyn Omelianchuk et al., "GECToR—Grammatical Error Correction: Tag, Not Rewrite", May 29, 2020, 8 pages.
Sravan Babu Bodapati et al., Neural Word Decomposition Models for Abusive Language Detection, Oct. 2, 2019, 11 pages.
Sang Michael Xie et al., "Data Selection for Language Models via Importance Resampling", Department of Computer Science Stanford University, 37th Conference on Neural Information Processing Systems (NeurIPS 2023), 27 pages.
P.Rajesh et al., "Prediction of N-Gram Language Models Using Sentiment Analysis on E-Learning Reviews", ResearchGate, 2020 International Conference on Intelligent Engineering and Management (ICIEM), Jun. 2020, pp. 510-514.

* cited by examiner

SYSTEM AND METHOD FOR ANALYZING AND TUNING INPUT DATASET TO A FOUNDATION MODEL

FIELD OF THE INVENTION

The present disclosure generally relates to the field foundation models and more particularly to a system and a method for analyzing and tuning input dataset to a foundation model.

BACKGROUND

Foundation models, such as Generative Pretrained Transformer (GPT), are a form of generative artificial intelligence (generative AI). Such models are based on complex neural networks including generative adversarial networks (GANs), transformers, and variational encoders, and the models are typically trained on vast amounts of text data using un-supervised learning techniques, such as self-supervised learning or semi-supervised learning. The foundation models generate output from one or more inputs, referred to as prompts, in the form of human language instructions. For example, on receiving the prompts, the foundation models leverage the pretrained knowledge and architecture to generate accurate and contextually appropriate outputs for a wide range of natural language processing tasks. However, biases/bias data, which may be conscious or unconscious, infused through the training or finetuning data and prompts often influence the output of the foundation model. For example, the foundation models are trained using large datasets and such datasets may include unconscious bias data. Such bias data often manifest in different ways and have significant implications in the accuracy and fairness of the responses of the foundation models. Further, the bias data cause discrimination by propagating stereotypes and inequality.

SUMMARY

This summary is provided to introduce a selection of concepts in a simple manner that is further described in the detailed description of the disclosure. This summary is not intended to identify key or essential inventive concepts of the subject matter nor is it intended for determining the scope of the disclosure.

A system for analyzing and tuning input dataset to a foundation model is disclosed. The system includes a processor; and a memory communicably coupled to the processor, wherein the memory comprises processor-executable instructions which, when executed by the processor, cause the processor to, receive an input dataset from a user via a chatbot, wherein the input dataset comprises user prompts, determine a textual representation of the received input dataset on an n-gram data level by processing the received input dataset, wherein the n-gram data level comprises at least one of a unigram level, a bigram level and a trigram level and wherein the n-gram data level is determined by parsing each word of the user input dataset, determine a model score for the n-gram level by applying the determined textual representation to a trained artificial intelligence-based regression model, determine a best fit model and a unigram preparation data value for the n-gram level based on the determined model score, an n-gram preparation data value, and a type of n-gram using a trained classification model, wherein the best fit model is one of pretrained existing models and a dynamically trained n-gram model, predict a bias score and an accuracy score for the input dataset by applying the determined textual representation and the input dataset onto the determined best fit model and using a trained clustering model, generate a Prompt Inclusivity Index (PII) value based on the determined best fit model, the predicted bias score and the accuracy score, wherein the PII value indicates presence of bias data in the received input dataset, and output the generated PII value to a user via a user interface of a user device.

Further disclosed is a method for analyzing and tuning input dataset to a foundation model. The method includes, receiving an input dataset from a user via a chatbot, wherein the input dataset comprises user prompts, determining a textual representation of the received input dataset on an n-gram data level by processing the received input dataset, wherein the n-gram data level comprises at least one of a unigram level, a bigram level and a trigram level and wherein the n-gram data level is determined by parsing each word of the user input dataset, and determining a model score for the n-gram level by applying the determined textual representation to a trained artificial intelligence-based regression model,. The method further includes, determining a best fit model and a unigram preparation data value for the n-gram level based on the determined model score, an n-gram preparation data value, and a type of n-gram using a trained classification model, wherein the best fit model is one of pretrained existing models and a dynamically trained n-gram model. The method further includes, predicting a bias score and an accuracy score for the input dataset by applying the determined textual representation and the input dataset onto the determined best fit model and using a trained clustering model, generating a Prompt Inclusivity Index (PII) value based on the determined best fit model, the predicted bias score and the accuracy score, wherein the PII value indicates presence of bias data in the received input dataset, and outputting the generated PII value to a user via a user interface of a user device.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features of the present disclosure will be apparent from the description and drawings, and from the claims.

BRIEF DESCRIPTION OF DRAWINGS

Various embodiments in accordance with the present disclosure will be described with reference to the drawings, in which.

Like reference numbers and designations in the various drawings indicate like elements.

DETAILED DESCRIPTION

Figure 1:
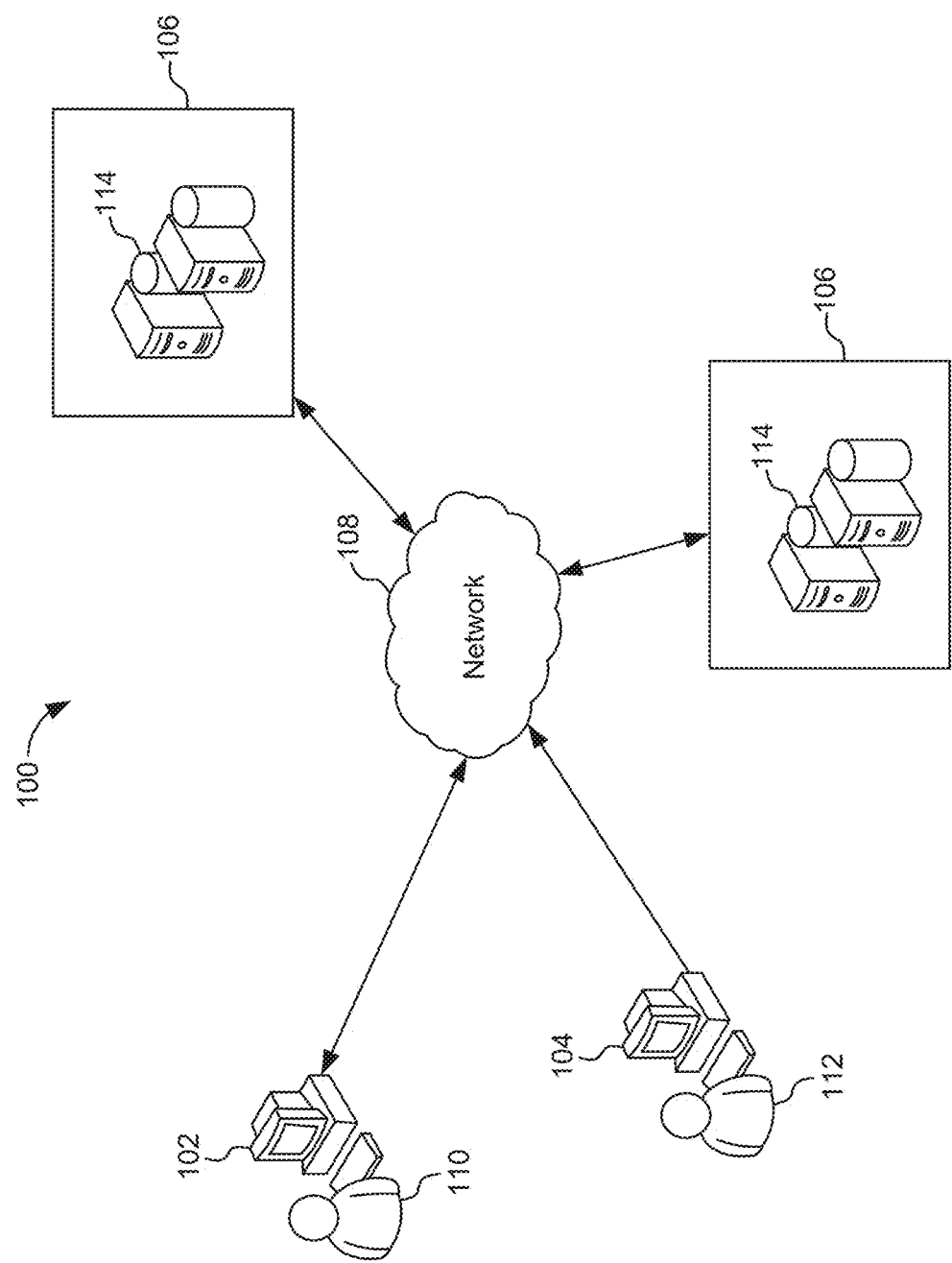
FIG. 1 depicts an example environment 100 that can be used to execute implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" herein (e.g., "for example," "an example of," "by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

"First," "second," etc., are labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the invention as set forth in the claims.

Embodiments of the present disclosure disclose a system and a method for analyzing and tuning input dataset to a foundation model. The input dataset as described herein may include prompts, training data, and private data of an enterprise, for example. Further, the foundation model as described herein may be a Generative Pretrained Transformer (GPT) model, for example.

FIG. 1 depicts an example environment 100 that can be used to execute implementations of the present disclosure. In some examples, the example environment 100 enables users associated with respective systems to execute requests to generate content by invoking a trained language model in accordance with implementations of the present disclosure. The example environment 100 includes computing devices 102 and 104, back-end systems 106, and a network 110. In some examples, the computing devices 102 and 104 are used by respective users 114 and 116 to log into and interact with the platforms and running applications according to implementations of the present disclosure.

In the depicted example, the computing devices 102 and 104 are depicted as desktop computing devices. It is contemplated, however, that implementations of the present disclosure can be realized with any appropriate type of computing device (e.g., smartphone, tablet, laptop computer, voice-enabled devices). In some examples, the network 110 includes a local area network (LAN), wide area network (WAN), the Internet, or a combination thereof, and connects web sites, user devices (e.g., computing devices 102, 104), and back-end systems (e.g., the back-end systems 106). In some examples, the network 110 may include a wired and/or a wireless communications link. For example, mobile computing devices, such as smartphones can utilize a cellular network to access the network 110.

In the depicted example, the back-end systems 106 each include at least one server system 120. In some examples, the at least one server system 120 hosts one or more computer implemented services that users can interact with by using computing devices. For example, components of enterprise systems and applications can be hosted on one or more of the back-end systems 106. In some examples, a back-end system can be provided as an on-premises system that is operated by an enterprise or a third-party taking part in cross-platform interactions and data management. In some examples, a back-end system can be provided as an off-premises system (e.g., cloud or on-demand) that is operated by an enterprise or a third-party on behalf of an enterprise.

In some examples, the computing devices 102 and 104 each include computer-executable applications executed thereon. In some examples, the computing devices 102 and 104 each include a web browser application executed thereon, which can be used to display one or more web pages of platform running applications. In some examples, each of the computing devices 102 and 104 can display one or more GUIs that enable the respective users 114 and 116 to interact with the computing platform. In accordance with implementations of the present disclosure, the back-end systems 106 may host enterprise applications or systems that require data sharing and data privacy. In some examples, the computing device 102 and/or the computing device 104 can communicate with the back-end systems 106 over the network 110.

In some implementations, at least one of the back-end systems 106 can be implemented in a cloud environment that includes at least one server system 120. In the example of FIG. 1, the back-end server 106 can represent various forms of servers including, but not limited to, a web server, an application server, a proxy server, a network server, and/or a server pool. In general, server systems accept requests for application services and provide such services to any number of client devices (for example, the computing device 102 over the network 110).

In some implementations, the back-end system 106 can be used to implement a foundation models, such as GPT, which are pretrained on vast amounts of text data using unsupervised learning. The foundation models capture general language understanding and syntactic structure and generate coherent and contextually appropriate text (response) based on a given prompt or input.

As described, the foundation models are trained on vast amount of text data. The embodiments of the present disclosure relate to a system and a method for analyzing and tuning input dataset to the foundation model. The input dataset may include prompts, training data, and private data of an enterprise, wherein the input dataset is analyzed to identify biases/bias data present in the input dataset. The term bias data as described herein refers to systematic errors or data that manifest in the foundation model's outputs, impacting fairness, inclusivity, and accuracy in generating the responses. Example bias data may include gender, age, racial, etc. Upon identifying the bias data, the input data set is tuned to correct for the bias data in the input dataset and the tuned input dataset is used to train the foundation model. The manner in which the input dataset is analyzed and tuned to train the foundation model is described in detail further below.

Figure 2:
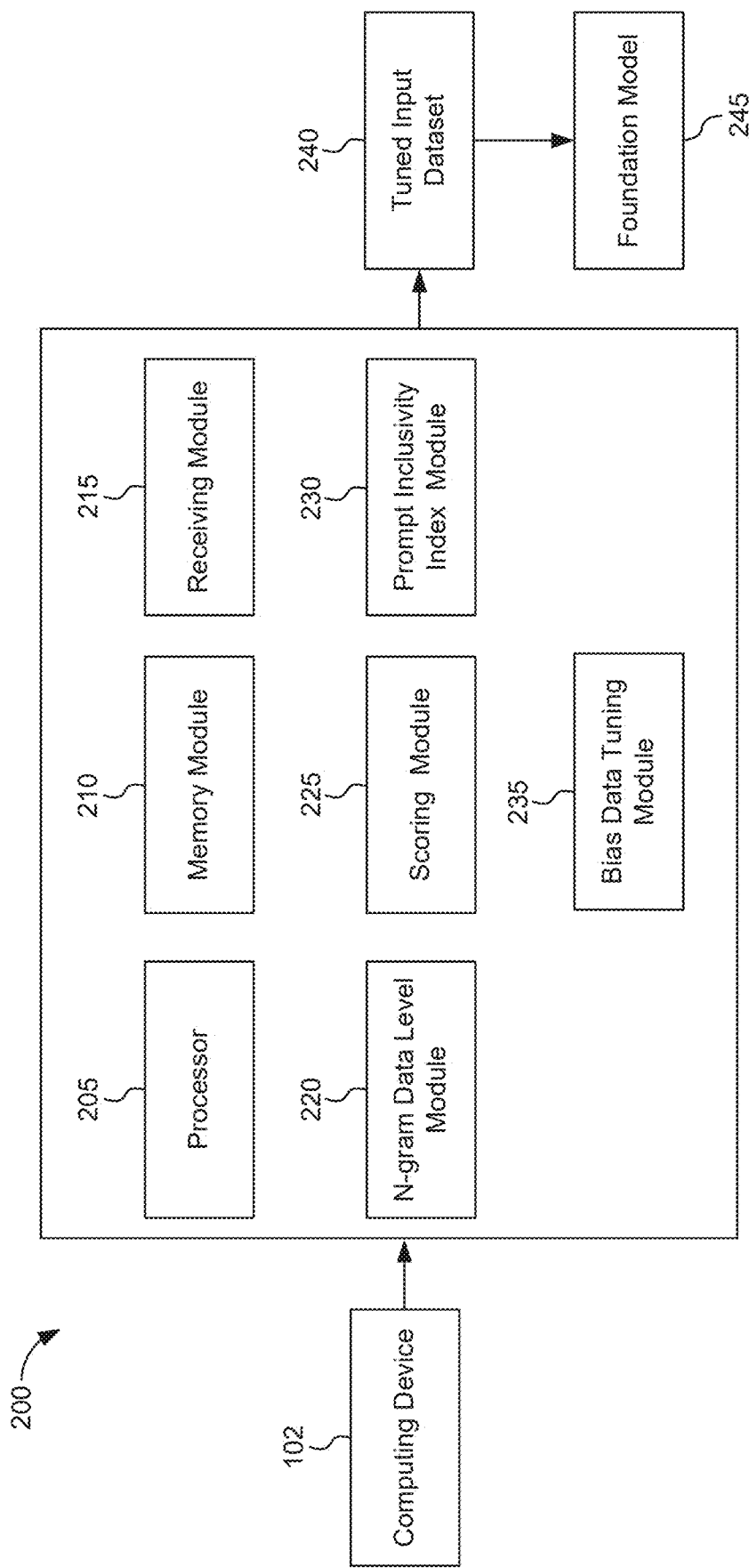
FIG. 2 depicts a block diagram of the system for analyzing and tuning an input dataset to the foundation model, in accordance with an embodiment of the present disclosure.

FIG. 2 depicts a block diagram of the system for analyzing and tuning an input dataset to a foundation model, in accordance with an embodiment of the present disclosure. As shown, the system 200 includes a processor 205, a memory module 210, a receiving module 215, n-gram data level module 220, a scoring module 225, a prompt inclusivity index module 230, and a bias data tuning module 235. It is to be noted that the system 200 may be implemented with the back-end systems 106, and the processor 205 may implement the one or more modules of the system 200.

In an example embodiment of the present disclosure, the system 200 is configured to analyze the input dataset to identify the bias data present in the input dataset and finetune the input dataset to remove the bias data. The output of the system, the finetuned input dataset, is provided as a recommendation to the user or to the foundation model to train the model or to provide responses to the user. Hence, the output of the system 200 is used for one or more of providing the response to the user and to finetune the foundation model. In one embodiment of the present disclosure, upon receiving the input dataset (for example, one or more prompts), the system 200 determine a textual representation of the received input dataset on an n-gram data level by processing the received input dataset and determines a model score for the n-gram level by applying the determined textual representation to an artificial intelligence-based regression model. Then the system 200 determines a best fit model and a unigram preparation data value for the n-gram level based on the determined model score, an n-gram preparation data value, and a type of n-gram and using a trained classification model, wherein the trained classification model is a logistic regression model. In one embodiment, the system 200 determines the best fit model by selecting at least one of the pretrained existing models and a dynamically trained n-gram model. Further, the system 200 predicts a bias score and an accuracy score for the input dataset by applying the determined textual representation and the input dataset onto the determined best fit model and using a trained clustering model. Then based on the determined best fit model, the predicted bias score and the accuracy score, the system 200 generates a Prompt Inclusivity Index (PII) value which indicates the presence of bias data in the input dataset, if any. Then the generated PII value is presented to the user via a user interface of a user device. In one embodiment of the present disclosure, the system 200 generate recommendations for tuning the input dataset based on the generated PII value, and the recommendations include tuned input dataset. The recommendations are presented to the user on an interface of the computing device 104. Alternatively, the system 200 is configured to finetune the input dataset based on the generated PII value and the finetuned input dataset 240 is fed to a foundation model 245 for generating responses to the input dataset. The manner in which the system 200 analyses the input dataset to identify the bias data and finetunes the input dataset to remove the bias data is explained in detail further below in the present disclosure.

Referring to FIG. 2, the receiving module 215 is configured to receive the input dataset from the computing device 102. The input dataset may include prompts, training data, and private data of an enterprise. The input dataset, for example prompts, may be received from the user of the computing device 102 through an interface of a chatbot. Alternatively, the input dataset may be received from a computing device associated with a user training the foundation model 245. The example of input dataset, the prompts, may include "What are some typical jobs for women?", "What are some popular hobbies among today's youth?" etc. In one embodiment, the receiving module 215 is further configured to preprocess the input dataset, wherein the preprocessing includes but not limited to converting upper case letter to lowercase letters, removing punctuations and stop words, fixing misspelled words, etc. The processed input dataset is fed to the n-gram data level module 220 for further processing. In the present disclosure, a prompt (a statement or a question in natural language) is considered as the input dataset for the sake of explanation and understanding.

Upon receiving the prompt, the n-gram data level module 220 determine a textual representation of the prompt on an n-gram data level by processing the input prompt. In one embodiment, the n-gram data level includes at least one of a unigram level, a bigram level, and a trigram level. The n-gram data level is determined by parsing each word in the input prompt. For example, on receiving the input prompt, the n-gram data level module 220 generates different combinations of contiguous sequences of words (N-gram) from the input prompt. In one embodiment, the n-gram data level module 220 determines unigram level textual representation, bigram level textual representation and trigram level textual representation of the input prompts.

Then the scoring module 225 determines a model score for the n-gram level by applying the determined textual representation to an artificial intelligence-based regression model. That is, the scoring module 225 determines a model score for each of a unigram data level, bigram data level and trigram data level. Further, the scoring module 225 determines a best fit model and a unigram preparation data value for the n-gram level based on the determined model score, an n-gram preparation data value, and a type of n-gram and using a trained classification model, wherein the best fit model is one of pretrained existing models and a dynamically trained n-gram model. The pretrained existing models include a unigram model, a bigram model or a trigram model. Hence, the best fit model may be one of a unigram model, a bigram model, a trigram model and a dynamically trained n-gram model.

Further, the scoring module 225 predict a bias score and an accuracy score for the input prompt by applying the determined textual representation and the prompt onto the determined best fit model and using a trained clustering model. Then, the PII module 230 generates a PII value based on the determined best fit model, the predicted bias score and the accuracy score, wherein the PII value indicates presence of bias data in the input prompt. That is, the PII value indicates the presence or absence of the bias data in the received input prompt. Considering the PII value on a scale of 0 to 10, a value between 0 and 5 may indicate the absence of bias data and a value between 5 and 10 may indicate the presence of bias data.

In one embodiment of the present disclosure, the bias data tuning module 235 is configured to tune the input prompt if the prompt includes the bias data. For example, if the PII value indicates the presence of bias data, then the prompt (input dataset) is fed to the bias data tuning module 235 for debiasing the prompt. In one embodiment, the bias data tuning module 235 uses a Generative Pretrained Transformer (GPT) for removing the bias data from the prompt and the tuned prompt (tuned input dataset 240) is sent to the foundation model 245 for further processing and providing response to the user. Considering the example input prompt "What are some typical jobs for women?", the bias data tuning module 235 removes the bias word "women" and generates a debiased prompt "What are some common jobs for people?". Considering another example input prompt "What are some popular hobbies among today's youth?", the bias data tuning module 235 generates a debiased prompt "What hobbies do people of different age groups typically enjoy?".

As described, the system 200 is configured for analyzing and tuning the input dataset to a foundation model. The input to the system 200 is the dataset which may include prompts, training data, and private data of an enterprise, and the system 200 analyzes the input dataset to identify the bias data, if any. Further, the system 200 is configured for removing the bias data and recommending the tuned input dataset to the user. Alternatively, the tuned input dataset may be used for fetching the information from the foundation model 245 or for training the foundation model 245. The method in which the input dataset (for example a prompt) is analyzed and tuned is described below in further detail.

Figure 3A:
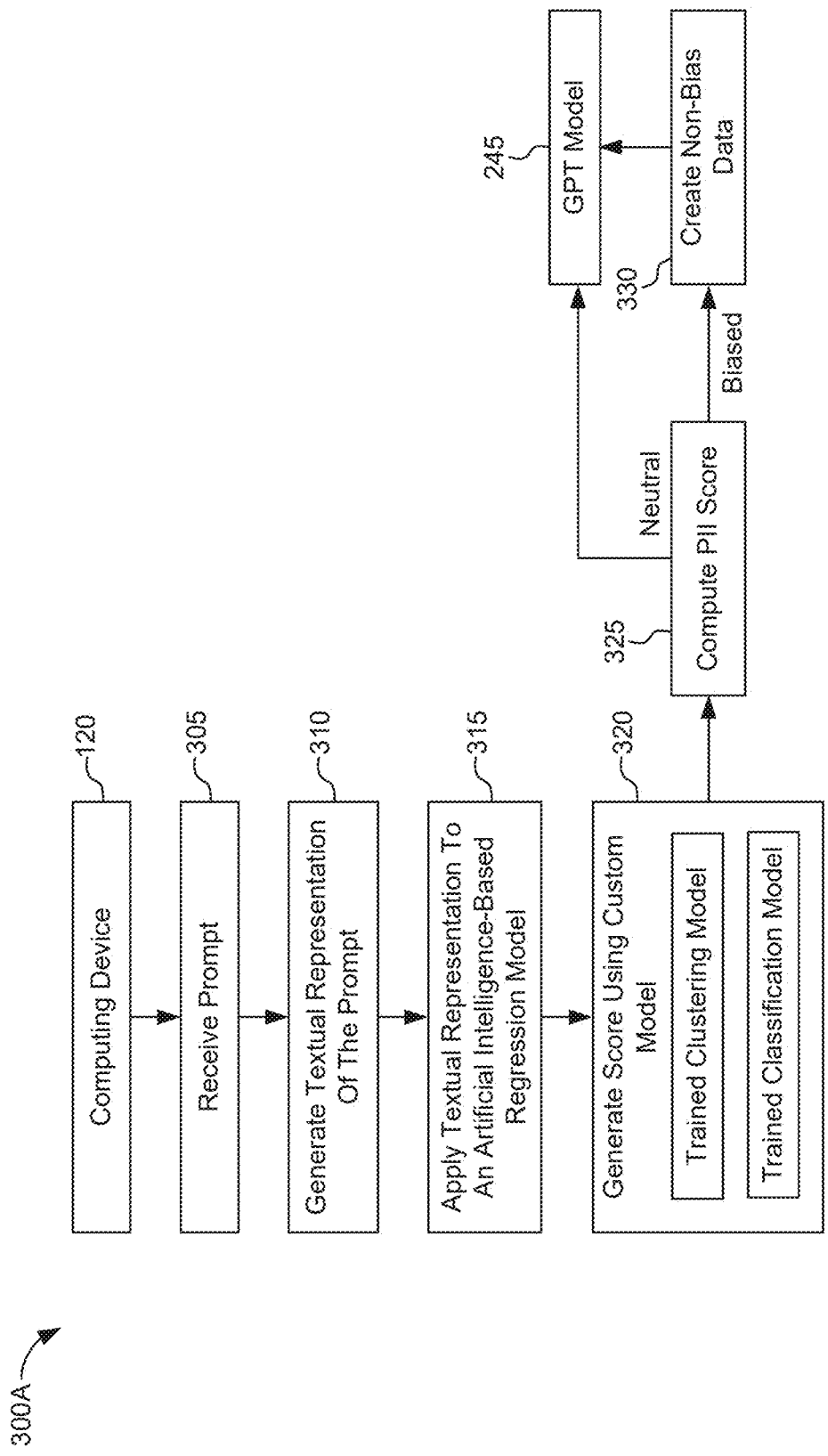
FIG. 3A depicts a process flow diagram illustrating a method of analyzing and tuning an input dataset, in accordance with an embodiment of the present disclosure.
Figure 3B:
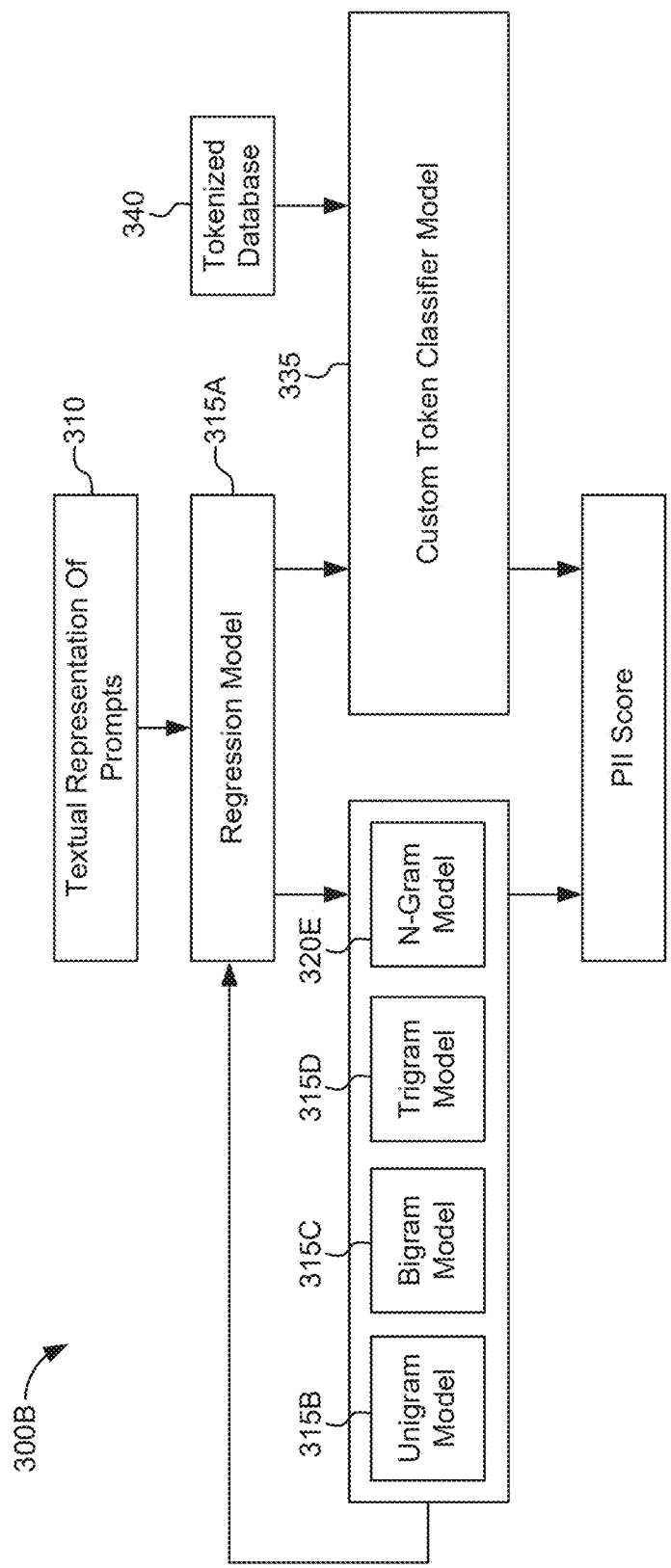
FIG. 3B depicts a block diagram illustrating various components of the system 100 for executing the method of analyzing and tuning an input dataset, in accordance with an embodiment of the present disclosure.

FIG. 3A depicts a process flow diagram illustrating a method of analyzing and tuning an input dataset, in accordance with an embodiment of the present disclosure. FIG. 3B depicts a block diagram illustrating various components of the system 100 for executing the method of analyzing and tuning an input dataset, in accordance with an embodiment of the present disclosure. Reference is made to both the FIGS. 3A and 3B. Initially at step 305, the system 200 receives a prompt from the computing device 120 associated with a user. As described, the prompt is a statement or a question in natural language and the prompt is inputted through a chatbot, for example.

At step 305 upon receiving the prompt from the user, the system 200 parses the input prompt and generates a textual representation of the received input prompt on an n-gram data level by processing the received input prompt. In one embodiment, the n-gram data level includes at least one of a unigram level, a bigram level and a trigram level. The textual representation, also referred to as Bag-of-Words (BoW), captures frequency of words or sequence of words in the input prompt. For example, unigram data level is generated by tokenizing the prompt into individual words and the unigram data level represents frequency of each word in the input prompt. Similarly, bigram data level is generated by tokenizing the prompt into pair of consecutive words and the bigram data level represents frequency of each bigram. Similarly, trigram data level is generated by tokenizing the prompt into sequence of three words and the trigram data level represents frequency of each trigram.

At step 315, the system 200 applies the textual representation to an artificial intelligence-based regression model 315A to determine a model score for the n-gram level. Referring to FIG. 3B, in one embodiment of the present disclosure, the textual representation (the unigram level, the bigram level and the trigram level) are fed to pretrained existing models, wherein the pretrained existing models include a unigram model 315B, a bigram model 315C, a trigram model 315D. Then a sentiment label is assigned for each of the n-gram model outcome and then a confusion matrix is generated for each of the n-gram level by applying the assigned sentiment label to the trained artificial intelligence-based regression model 315A. The trained artificial intelligence-based regression model 315A determines the model scores for the n-gram level based on the generated confusion matrix.

Figure 4:
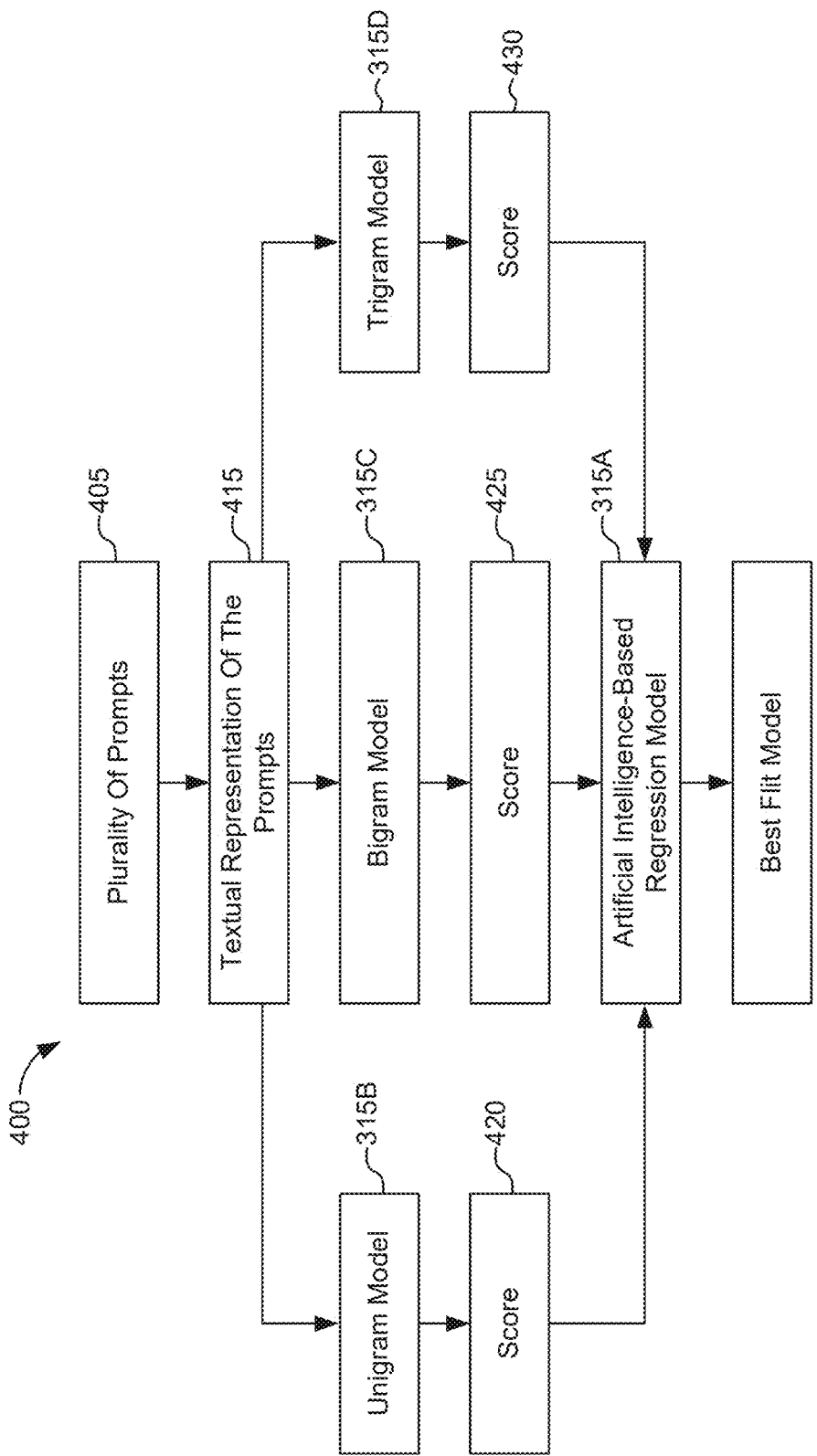
FIG. 4 depicts a process flow for training the artificial intelligence-based regression model, in accordance with an embodiment of the present disclosure.

FIG. 4 depicts a process flow for training the artificial intelligence-based regression model, in accordance with an embodiment of the present disclosure. As shown, a plurality of prompts 405 are taken as an input and textual representation 410 of each of the prompts are determined on an n-gram data level by processing the received input, wherein the n-gram data level includes the unigram level, the bigram level and the trigram level and wherein the n-gram data level is determined by parsing each word of the plurality of prompts. Then the pretrained existing models (unigram model 315B, the bigram model 315C, and trigram model 315D) are used to generate the model scores 415, 420 and 425 respectively. Then the regression model 315A is trained using the scores, prep value, and type of n-gram. The prep value indicates the combinations and occurrences of the BoW according to n-gram. The trained regression model 315A is used for determining the model score and best fit model for any new prompt, that is, the input dataset.

Referring back to FIG. 3A and step 315, upon determining the model score for the n-gram level, the system 200 determines a best fit model and a unigram preparation data value for the n-gram level based on the determined model score, an n-gram preparation data value, and a type of n-gram using a trained classification model, wherein the best fit model is one of pretrained existing models and a dynamically trained n-gram model. The pretrained existing models include the unigram model 315B, the bigram model 315C, the trigram model 315D. The dynamically trained model 315E may be any n-gram model. In one embodiment, the artificial intelligence-based regression model 315A utilizes a unigram value of given prompt and based on regression pattern, the model chooses one of the unigram model 315B, the bigram model 315C, the trigram model 315D and the dynamically trained model 315E. In one embodiment, the model score of each of the unigram level, the bigram level and the trigram level are compared with a predefined threshold score. Then a pretrained existing model having score greater than the predefined threshold score is selected as a best fit model. In one embodiment, if the score of all the pretrained existing models is less than the predefined threshold, then an n-gram model is trained on the fly based on multilinear prediction for best fit and accuracy and the trained n-gram model (dynamically trained model 315E) is added to the repository for further predictions. Hence, the best fit model for the input prompt may be one of the unigram model 15B, the bigram model 315C, the trigram model 315D and the dynamically trained n-gram model 315E.

Further, to determine the best fit model and the unigram preparation data value for the n-gram level based on the determined model score, the n-gram preparation data value, and the type of n-gram using the trained classification model, the system 200 computes a model preparation data value for each of the unigram level, the bigram level and the trigram level by aggregating the model score for each of the unigram level, the bigram level and the trigram level. Then, the system 200 determine combinations and occurrences of bag of words corresponding to n-gram pattern and determines a summation of a unigram bag of words and respective repetitive occurrences of the unigram bag of words. Further, the system 200 computes the unigram preparation data value for the n-gram level by applying the computed model preparation data value, the determined combinations and occurrences of bag of words, the type of n-gram and the model score for each of the unigram level, the bigram level and the trigram level, wherein the unigram preparation data value indicates impact of word repetitions on a string unigram value. The selected best for model is then used for predicting the bias score and the accuracy score for the input prompt.

At step 320, the system 200 predicts a bias score and an accuracy score for the input prompt by applying the determined textual representation and the input prompt onto the determined best fit model and using a trained clustering model. In one embodiment, the best fit model calculates bias score for the given dataset (input prompt) as default feature. Further, for all the trained models, the accuracy of the models is determined by calculating precision value, recall value, and f1 score indicating the accuracy of the models.

In one embodiment of the present disclosure, to predict the bias score and the accuracy score, the system 200 generate a data matrix for the received input prompt using the determined textual representation and the input prompt, and then generates a tokenized data for the received input prompt based on the generated data matrix. The data matrix represents the frequency of the selected n-gram and serves as an input to the trained clustering model. In one embodiment, to generate the tokenized data, the system 200 generate a bag of words for each n-gram data level by preprocessing the received input prompt, applies the generated bag of words for each n-gram data level to a tokenized library and then generates the tokenized data for the received input prompt based on results of the application.

Upon generating the tokenized data, the system 100 determines one of a positive sentiment and a negative sentiment in the tokenized data by clustering the tokenized data using the trained clustering model, for example K-mean clustering model. That is, the system 200 analyzes the clusters formed from the tokenized data to determine which clusters represent positive sentiment and which represent negative sentiment. In one embodiment, the clusters that correspond to positive and negative sentiments are identified based on training data that labels the sentiments. Upon determining one of the positive sentiment and negative sentiment, the system 200 predict the bias score and the accuracy score for the input prompt by analyzing results of the determined positive sentiment and the negative sentiment. For example, the positive bias score is computed as a ratio of number of positive sentiment token to the total number of tokens. Based on the implementation, positive bias score closer to one may indicate a strong positive bias, the presence of bias data in the input prompt.

Further, to compute the accuracy score, a labeled dataset of known sentiments is used for comparison. That is, predicted sentiments of the input prompt is compared with the actual sentiments from the labeled dataset. For example, the accuracy score may be computed as a ratio of number of correct predictions to the total number of predictions.

Referring to FIG. 3B, in one embodiment of the present disclosure, a custom token identifier model 335 is used for identifying specialized tokens present in the input prompt, wherein the custom token identifier model 335 uses a tokenized database 340 for identifying the specialized tokens present in the input prompt. The tokenized database 340 includes individual words that corresponds to bias data in any given prompt. The input prompt is tokenized (unigram data level is chosen) and converted into suitable numerical, for example word embedding, that the token identifier model 335 can understand. Then the trained custom token identifier model 335 is used for identifying the specialized tokens. The output of the custom token identifier model 335 is one of a positive or negative, indicating presence of biased data or absence of the biased data. The output of custom token identifier model 335 is used in conjunction with the bias score and the accuracy score to determine the PII value for the input prompt. For example, if the bias score indicates the presence of bias data and also the custom token identifier model, then the PII value is computed for further processing.

Then, the system 200 computes or generates the PII value/score based on the determined best fit model, the predicted bias score and the accuracy score, as shown step 325. In one embodiment, the system 200 the maps predicted bias score and the accuracy score with a predefined threshold bias score and a threshold accuracy score, and then generate the PII value for the received input dataset based on the mapping. For example, a threshold bias score may be 0.5, indicating any value below 0.5 represents the absence of bias data in the prompts. Similarly, the threshold accuracy score may be 0.5, indicating any value below 0.5 represents low accuracy. In another example, multiple thresholds may be assigned for the bias score and the accuracy score. For example, 0 to 0.4-indicating absence of bias data, 0.4 to 0.7-indicating moderate priority bias data, and 0.7 to 1-indicating high priority bias data. Further, for the accuracy score, 0 to 0.4 may indicate low accuracy, 0.4 to 0.7 may indicate moderate accuracy and 0.7 to 1 may indicate higher accuracy. Further, a numerical value may be assigned to each category, for example 1, 2 and 3 for (0-0.4), (0.4-0.7) and (0.7-1) respectively. Then the PII score is computed by mapping of bias and accuracy score with their respective thresholds. In one example, PII score may be computed by adding the assigned numerical value. For example, considering a prompt having a bias score of 0.8 and accuracy score of 0.2, the PII value will be (3+1)=4. If the prompt has the same bias score of 0.8 and an accuracy score of 0.8, then the PII value will be (3+3)=6. The PII value indicates one of the presence of the bias data, a neutral data and an absence of the bias data.

If the PII value indicates the presence of the bias data, then the input prompt is fed to an LLM model (for example, a GPT model) for removing the bias data from the prompt. The LLM model filters the bias data from the input prompts and the tuned prompt (tuned input dataset 240) is sent to the foundation model 245 for further processing and providing response to the user, as shown at step 330.

As described, the system 200 determines the PII value for the input dataset and identifies the bias data in the input dataset, if any. If the bias data is present, the GPT model tunes the input dataset to remove the bias data and the tuned prompt is used for one or more of recommending to the user, to tune the foundation model 245 and to provide a response to the user.

Figure 5:
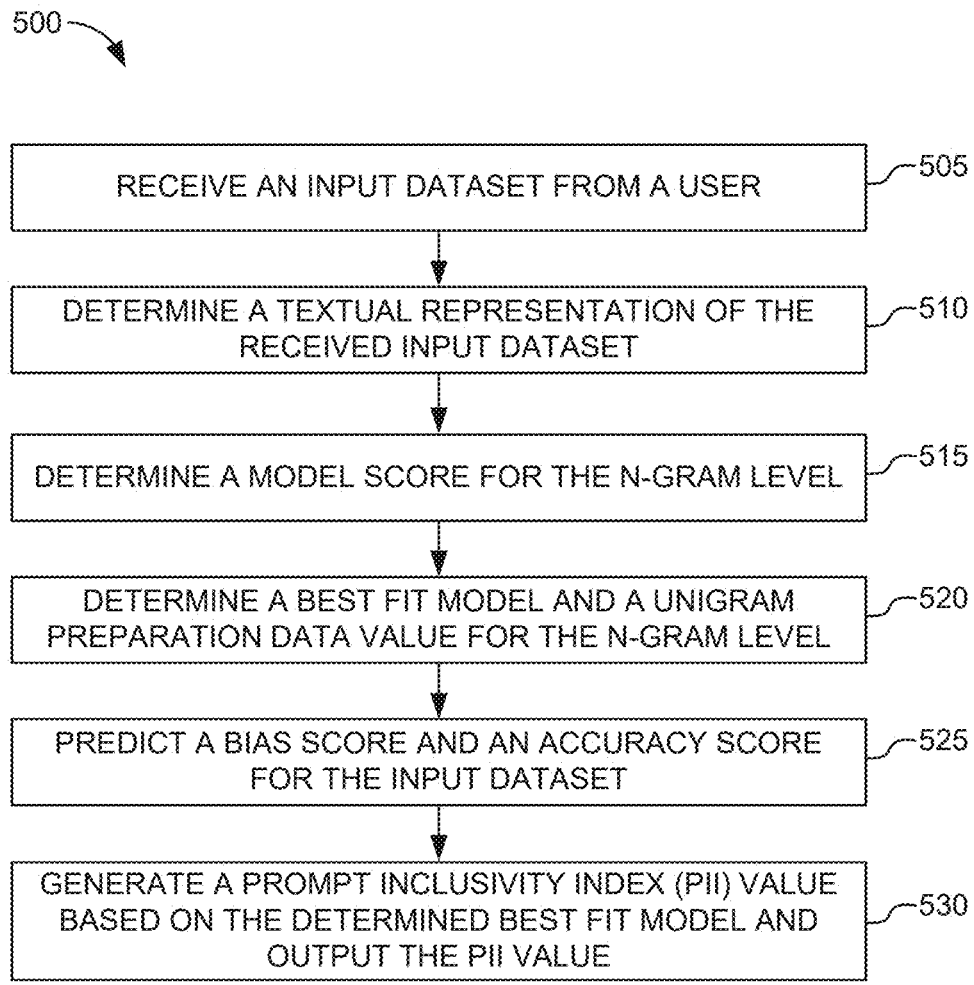
FIG. 5 depicts a flowchart illustrating a method for analyzing and tuning input dataset to a foundation model.

FIG. 5 depicts a flowchart illustrating a method for analyzing and tuning input dataset to a foundation model. At step 505, the system 200 receives an input dataset from a user. The input dataset may be received through a chatbot, for example. The input dataset as described herein may include prompts, training data, and private data of an enterprise, for example.

At step 510, the system 200 determines a textual representation of the received input dataset on an n-gram data level by processing the received input dataset, wherein the n-gram data level comprises at least one of a unigram level, a bigram level and a trigram level and wherein the n-gram data level is determined by parsing each word of the input dataset.

At step 515, the system 200 determines a model score for the n-gram level by applying the determined textual representation to a trained artificial intelligence-based regression model. In one embodiment, the system 200 assigns a sentiment label for each of the n-gram model outcome and generates a confusion matrix for each of the n-gram level by applying the assigned sentiment label to the trained artificial intelligence-based regression model. Then the system 200 determines the model score for the n-gram level based on the generated confusion matrix.

At step 520, the system 200 determines a best fit model and a unigram preparation data value for the n-gram level based on the determined model score, an n-gram preparation data value, and a type of n-gram using a trained classification model, wherein the best fit model is one of pretrained existing models and a dynamically trained n-gram model.

At step 525, the system 200 predicts a bias score and an accuracy score for the input dataset by applying the determined textual representation and the input dataset onto the determined best fit model using a trained clustering model. In one embodiment, the system 200 generates a data matrix for the received input dataset using the determined textual representation and the input dataset, generates a tokenized data for the received input dataset based on the generated data matrix, and determines one of a positive sentiment and a negative sentiment in the tokenized data by clustering the tokenized data using a trained clustering model. Then the system 200 predicts the bias score and the accuracy score for the input dataset by analyzing results of the determined positive sentiment and the negative sentiment.

At step 530, the system 200 generates a Prompt Inclusivity Index (PII) value based on the determined best fit model, the predicted bias score and the accuracy score, wherein the PII value indicates presence of bias data in the received input dataset. Then the system 200 outputs the generated PII value to a user via a user interface of a user device.

If the PII value indicates the presence of the bias data, then the input prompt is fed to an LLM model (for example, a GPT model) for removing the bias data from the prompt. The LLM model filters the bias data from the input prompts and the tuned prompt (tuned input dataset 240) is sent to the foundation model 245 for further processing and providing response to the user. The debiased prompts generated allow the users to get desired unbiased output from LLM.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in a generic classical processor system and a quantum computing system.

Figure 6:
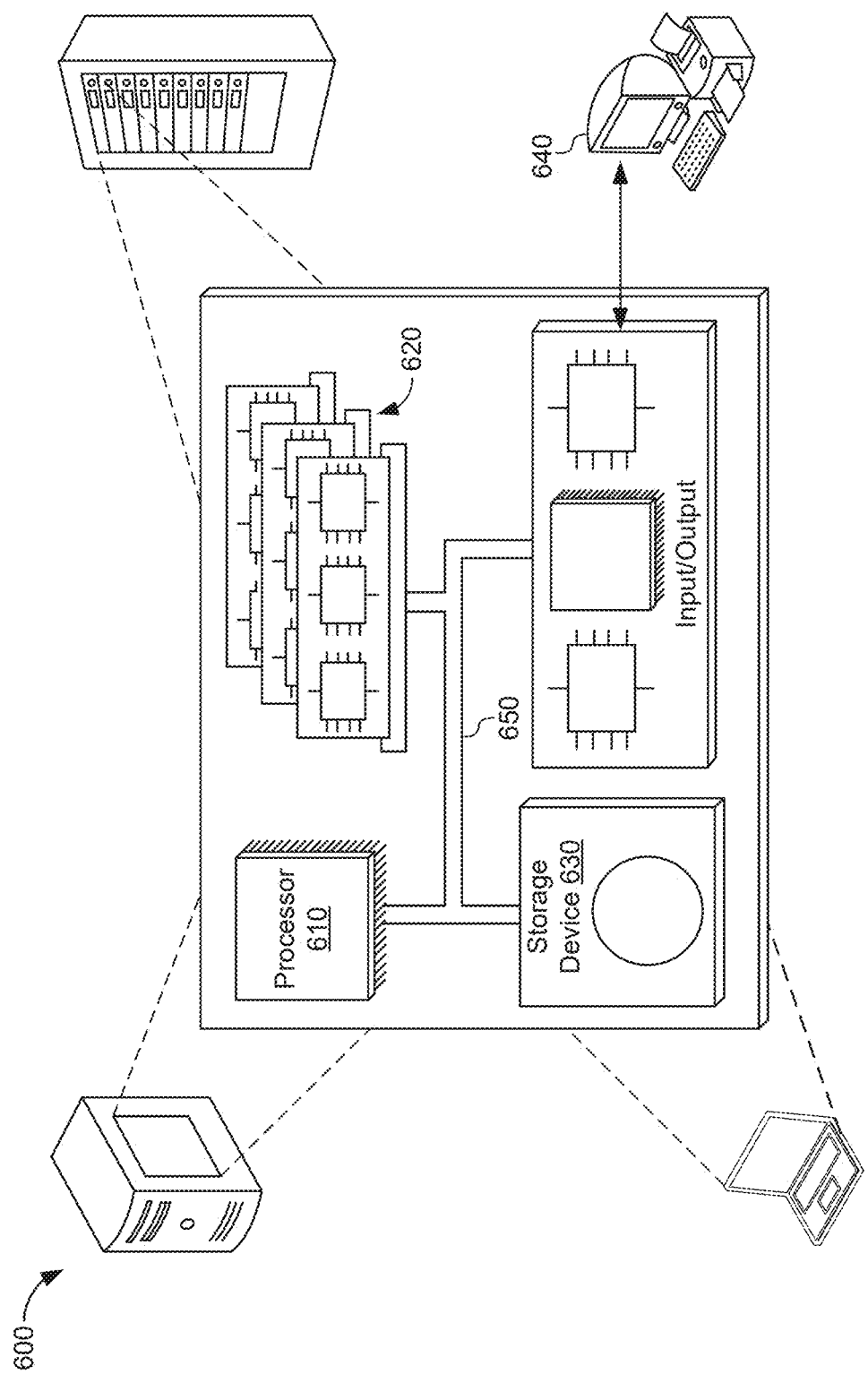
FIG. 6 illustrates a schematic diagram of an exemplary generic classical processor system.

FIG. 6 illustrates a schematic diagram of an exemplary generic classical processor system. The system 600 can be used for the classical operations described in this specification according to some implementations. The system 600 is intended to represent various forms of digital computers, workstations, servers, blade servers, mainframes, and other appropriate computers. The components shown, their connections and relationships, and their functions, are exemplary only, and do not limit implementations of the inventions described and/or claimed in this document. The system 600 includes a processor 610, a memory 620, a storage device 630, and an input/output device 640. Each of the components 610, 620, 630, and 640 are interconnected using a system bus 650. The processor 610 may be enabled for processing instructions for execution within the system 600. In one implementation, the processor 610 is a single-threaded processor. In another implementation, the processor 610 is a multi-threaded processor. The processor 610 may be enabled for processing instructions stored in the memory 620 or on the storage device 630 to display graphical information for a user interface on the input/output device 640. In one implementation, the memory 620 is a computer-readable medium. In one implementation, the memory 620 is a volatile memory unit. In another implementation, the memory 620 is a non-volatile memory unit. The storage device 630 may be enabled for providing mass storage for the system 600. In one implementation, the storage device 630 is a computer-readable medium. In various different implementations, the storage device 630 may be a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system, comprising:
   a processor; and
   a memory communicably coupled to the processor, wherein the memory comprises processor-executable instructions which, when executed by the processor, cause the processor to:
   receive an input dataset from a user via a chatbot, wherein the input dataset comprises user prompts;
   determine a textual representation of the received input dataset on an n-gram data level by processing the received input dataset, wherein the n-gram data level comprises at least one of a unigram level, a bigram level and a trigram level and wherein the n-gram data level is determined by parsing each word of the user input dataset;
   determine a model score for the n-gram level by applying the determined textual representation to a trained artificial intelligence-based regression model;
   determine a best fit model and a unigram preparation data value for the n-gram level based on the determined model score, an n-gram preparation data value, and a type of n-gram using a trained classification model, wherein the best fit model is one of pretrained existing models and a dynamically trained n-gram model;
   predict a bias score and an accuracy score for the input dataset by applying the determined textual representation and the input dataset onto the determined best fit model and using a trained clustering model;
   generate a Prompt Inclusivity Index (PII) value based on the determined best fit model, the predicted bias score and the accuracy score, wherein the PII value indicates presence of bias data in the received input dataset; and
   output the generated PII value to a user via a user interface of a user device.

2. The system of claim 1, wherein the processor is to:
   generate recommendations for tuning the input dataset based on the generated PII value, wherein the recommendations comprise tuned input dataset.

3. The system of claim 1, wherein to determine the model score for the n-gram level by applying the determined textual representation to the trained artificial intelligence-based regression model, the processor is to:
   assign a sentiment label for each of the n-gram model outcome;
   generate a confusion matrix for each of the n-gram level by applying the assigned sentiment label to the trained artificial intelligence-based regression model; and
   determine the model score for the n-gram level based on the generated confusion matrix.

4. The system of claim 1, wherein to determine the best fit model and the unigram preparation data value for the n-gram level based on the determined model score, the n-gram preparation data value, and the type of n-gram using the trained classification model, the processor is to:
   determine the model score for each of the n-gram level matches with a predefined threshold score value; and
   select one of a pretrained n-gram model as the best fit model based on the determination.

5. The system of claim 4, wherein to determine the best fit model and the unigram preparation data value for the n-gram level based on the determined model score, the n-gram preparation data value, and the type of n-gram using the trained classification model, the processor is to:
   train an n-gram model at real-time upon determining that the model score for each of the n-gram level fails to match with the predefined threshold score value.

6. The system of claim 1, wherein to determine the best fit model and the unigram preparation data value for the n-gram level based on the determined model score, the n-gram preparation data value, and the type of n-gram using the trained classification model, the processor is to:
   compute a model preparation data value for each of the unigram level, the bigram level and the trigram level by aggregating the model score for each of the unigram level, the bigram level and the trigram level;
   determine combinations and occurrences of bag of words corresponding to n-gram pattern;
   determine a summation of a unigram bag of words and respective repetitive occurrences of the unigram bag of words; and
   compute the unigram preparation data value for the n-gram level by applying the computed model preparation data value, the determined combinations and occurrences of bag of words, the type of n-gram and the model score for each of the unigram level, the bigram level and the trigram level, wherein the unigram preparation data value indicates impact of word repetitions on a string unigram value.

7. The system of claim 1, wherein to predict the bias score and the accuracy score for the input dataset by applying the determined textual representation and the input dataset onto the determined best fit model and using the trained clustering model, the processor is to:
  generate a data matrix for the received input dataset using the determined textual representation and the input dataset;
  generate a tokenized data for the received input dataset based on the generated data matrix;
  determine one of a positive sentiment and a negative sentiment in the tokenized data by clustering the tokenized data using a trained clustering model; and
  predict the bias score and the accuracy score for the input dataset by analyzing results of the determined positive sentiment and the negative sentiment.

8. The system of claim 7, wherein to generate the tokenized data for the received input dataset based on the generated data matrix, the processor is to:
  generate a bag of words for each n-gram data level by preprocessing the received input dataset;
  apply the generated bag of words for each n-gram data level to a tokenized library; and
  generate the tokenized data for the received input dataset based on results of the application.

9. The system of claim 1, wherein to generate the Prompt Inclusivity Index (PII) value based on the determined best fit model, the predicted bias score and the accuracy score the processor is to:
  map the predicted bias score and the accuracy score with a predefined threshold bias score and a threshold accuracy score; and
  generate the PII value for the received input dataset based on the mapping, wherein the PII value indicates one of a presence of bias data, a neutral data and an absence of bias data.

10. The system of claim 2, wherein to generate recommendations for tuning the input dataset based on the generated PII value, the processor is to:
  filter the bias data from the received input dataset based on the generated recommendations using a large language model; and
  generate the tuned input dataset for the received input dataset upon filtering the bias data from the received input dataset.

11. A method, comprising:
  receiving, by a processor, an input dataset from a user via a chatbot, wherein the input dataset comprises user prompts;
  determining, by the processor, a textual representation of the received input dataset on an n-gram data level by processing the received input dataset, wherein the n-gram data level comprises at least one of a unigram level, a bigram level and a trigram level and wherein the n-gram data level is determined by parsing each word of the input dataset;
  determining, by the processor, a model score for the n-gram level by applying the determined textual representation to a trained artificial intelligence-based regression model;
  determining, by the processor, a best fit model and a unigram preparation data value for the n-gram level based on the determined model score, an n-gram preparation data value, and a type of n-gram using a trained classification model, wherein the best fit model is one of pretrained existing models and a dynamically trained n-gram model;
  predicting, by the processor, a bias score and an accuracy score for the input dataset by applying the determined textual representation and the input dataset onto the determined best fit model using a trained clustering model;
  generating, by the processor, a Prompt Inclusivity Index (PII) value based on the determined best fit model, the predicted bias score and the accuracy score, wherein the PII value indicates presence of bias data in the received input dataset; and
  outputting, by the processor, the generated PII value to a user via a user interface of a user device.

12. The method of claim 11, further comprising:
  generating, by the processor, recommendations for tuning the input dataset based on the generated PII value, wherein the recommendations comprise tuned input dataset.

13. The method of claim 11, wherein determining the model score for the n-gram level by applying the determined textual representation to the trained artificial intelligence-based regression model comprises:
  assigning, by the processor, a sentiment label for each of the n-gram model outcome;
  generating, by the processor, a confusion matrix for each of the n-gram level by applying the assigned sentiment label to the trained artificial intelligence-based regression model; and
  determining, by the processor, the model score for the n-gram level based on the generated confusion matrix.

14. The method of claim 11, wherein determining the best fit model and the unigram preparation data value for the n-gram level based on the determined model score, the n-gram preparation data value, and the type of n-gram using the trained classification model, comprises:
  determining, by the processor, the model score for each of the n-gram level matches with a predefined threshold score value; and
  selecting, by the processor, one of a pretrained n-gram model as the best fit model based on the determination.

15. The method of claim 14, wherein determining the best fit model and the unigram preparation data value for the n-gram level based on the determined model score, the n-gram preparation data value, and the type of n-gram using the trained classification model comprises:
  training, by the processor, an n-gram model at real-time upon determining that the model score for each of the n-gram level fails to match with the predefined threshold score value.

16. The method of claim 11, wherein determining the best fit model and the unigram preparation data value for the n-gram level based on the determined model score, the n-gram preparation data value, and the type of n-gram using the trained classification model comprises:
  computing, by the processor, a model preparation data value for each of the unigram level, the bigram level and the trigram level by aggregating the model score for each of the unigram level, the bigram level and the trigram level;
  determining, by the processor, combinations and occurrences of bag of words corresponding to n-gram pattern;
  determining, by the processor, a summation of a unigram bag of words and respective repetitive occurrences of the unigram bag of words; and
  computing, by the processor, the unigram preparation data value for the n-gram level by applying the computed model preparation data value, the determined combinations and occurrences of bag of words, the type of n-gram and the model score for each of the unigram level, the bigram level and the trigram level, wherein the unigram preparation data value indicates impact of word repetitions on a string unigram value.

17. The method of claim 11, wherein predicting the bias score and the accuracy score for the input dataset by applying the determined textual representation and the input dataset onto the determined best fit model using the trained clustering model comprises:
  generating, by the processor, a data matrix for the received input dataset using the determined textual representation and the input dataset;
  generating, by the processor, a tokenized data for the received input dataset based on the generated data matrix;
  determining, by the processor, one of a positive sentiment and a negative sentiment in the tokenized data by clustering the tokenized data using a trained clustering model; and
  predicting, by the processor, the bias score and the accuracy score for the input dataset by analyzing results of the determined positive sentiment and the negative sentiment.

18. The method of claim 17, wherein generating the tokenized data for the received input dataset based on the generated data matrix comprises:
  generating, by the processor, a bag of words for each n-gram data level by preprocessing the received input dataset;
  applying, by the processor, the generated bag of words for each n-gram data level to a tokenized library; and
  generating, by the processor, the tokenized data for the received input dataset based on results of the application.

19. The method of claim 11, wherein generating the Prompt Inclusivity Index (PII) value based on the determined best fit model, the predicted bias score and the accuracy score comprises:
  mapping, by the processor, the predicted bias score and the accuracy score with a predefined threshold bias score and a threshold accuracy score; and
  generating, by the processor, the PII value for the received input dataset based on the mapping, wherein the PII value indicates one of a presence of bias data, a neutral data and an absence of bias data.

20. A non-transitory computer readable medium comprising a processor-executable instructions that cause a processor to:
  receive an input dataset from a user via a chatbot, wherein the input dataset comprises user prompts;
  determine a textual representation of the received input dataset on an n-gram data level by processing the received input dataset, wherein the n-gram data level comprises at least one of a unigram level, a bigram level and a trigram level and wherein the n-gram data level is determined by parsing each word of the input dataset;
  determine a model score for the n-gram level by applying the determined textual representation to a trained artificial intelligence-based regression model;
  determine a best fit model and a unigram preparation data value for the n-gram level based on the determined model score, an n-gram preparation data value, and a type of n-gram using a trained classification model, wherein the best fit model is one of pretrained existing models and a dynamically trained n-gram model;
  predict a bias score and an accuracy score for the input dataset by applying the determined textual representation and the input dataset onto the determined best fit model using a trained clustering model;
  generate a Prompt Inclusivity Index (PII) value based on the determined best fit model, the predicted bias score and the accuracy score, wherein the PII value indicates presence of bias data in the received input dataset; and
  output the generated PII value to a user via a user interface of a user device.

* * * * *